United States Patent [19]

DePolo et al.

[11] Patent Number: 4,652,369
[45] Date of Patent: Mar. 24, 1987

[54] FILTERING SYSTEM FOR SWIMMING POOLS

[75] Inventors: Anthony R. DePolo, Shavertown; Robert M. Pascolini, Exeter, both of Pa.

[73] Assignee: U.S. Leisure Incorporated, Incline Village, Nev.

[21] Appl. No.: 639,922

[22] Filed: Aug. 10, 1984

Related U.S. Application Data

[63] Continuation of Ser. No. 438,695, Nov. 2, 1982, abandoned.

[51] Int. Cl.⁴ .................... B01D 27/12; B01D 29/18; B01D 29/38
[52] U.S. Cl. .................................. 210/169; 210/196; 210/278; 210/304; 210/356; 210/411; 210/411.2; 210/425; 210/487; 210/512.1
[58] Field of Search .................. 210/169, 416.2, 356, 210/384, 390, 196, 278, 304, 411, 416.1, 425, 269, 275, 338, 487, 512.1

[56] References Cited

U.S. PATENT DOCUMENTS

| | | | |
|---|---|---|---|
| 548,487 | 10/1895 | Way | 210/356 |
| 718,358 | 1/1903 | Kneuper | 210/356 |
| 2,365,766 | 12/1944 | Levier | 210/356 |
| 2,460,084 | 1/1949 | Hebo | 210/356 |
| 2,960,232 | 11/1960 | Gillette | 210/169 |
| 2,980,256 | 4/1961 | Nash | 210/169 |
| 2,985,307 | 5/1961 | Grasmere et al. | 210/169 |
| 2,985,308 | 5/1961 | Koupal | 210/169 |
| 3,285,420 | 11/1966 | Muller | 210/356 |
| 3,291,310 | 12/1966 | Marvel | 210/169 |
| 3,386,382 | 6/1967 | Bozek et al. | 210/356 |
| 3,670,898 | 6/1972 | Fournier | 210/356 |
| 4,058,464 | 11/1977 | Rogers | 210/356 |
| 4,115,276 | 9/1978 | Kelly | 210/169 |
| 4,263,139 | 4/1981 | Erlich | 210/169 |
| 4,297,222 | 10/1981 | Takeguchi et al. | 210/169 |

Primary Examiner—Richard V. Fisher
Assistant Examiner—Wanda L. Millard
Attorney, Agent, or Firm—David A. Tamburro

[57] ABSTRACT

A filter assembly especially suitable for filtering swimming pool water includes an upright tank, and a flexible, cylindrical porous filter bag supported on star shaped core elements which are vertically spaced along a perforated outlet tube fixed centrally within the tank. Water normally flows through a filter media such as diatomaceous earth caked on the outside of the bag into the central tube and out of the tank back to the pool. When the bag becomes clogged by dirt trapped on the outer face of the filter cake, water flow is reversed for a short period of time to expand the bag suddenly and thereby release the dirt. The bag and filter media are regenerated periodically in this fashion to prolong the effective performance life of the filter.

9 Claims, 6 Drawing Figures

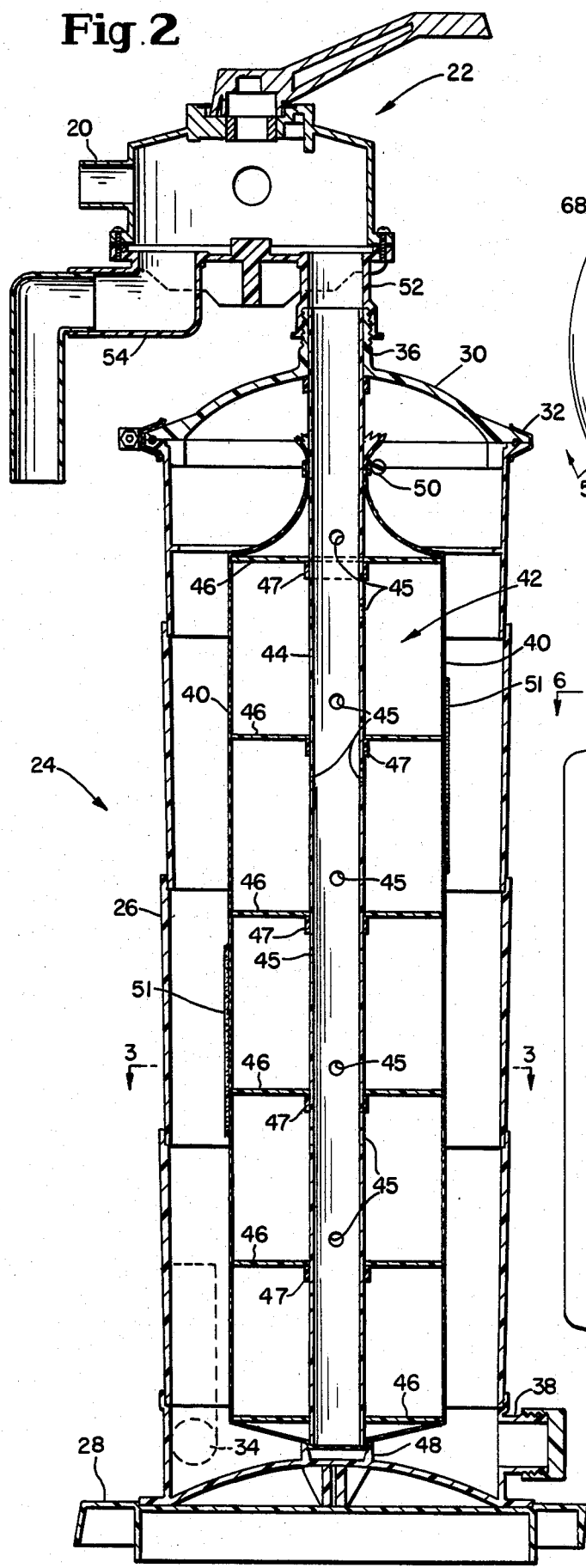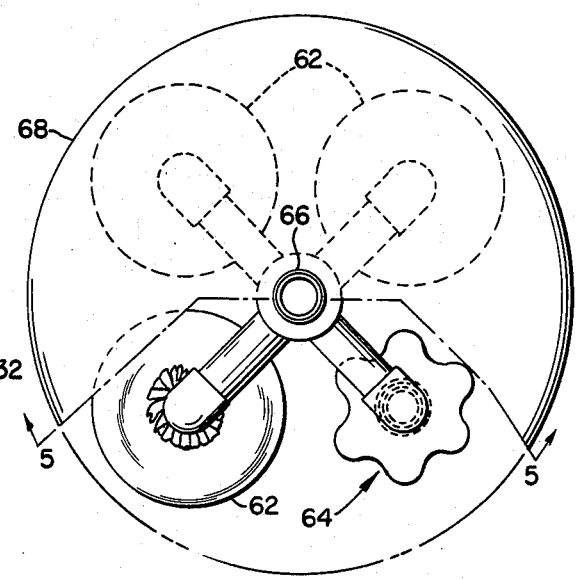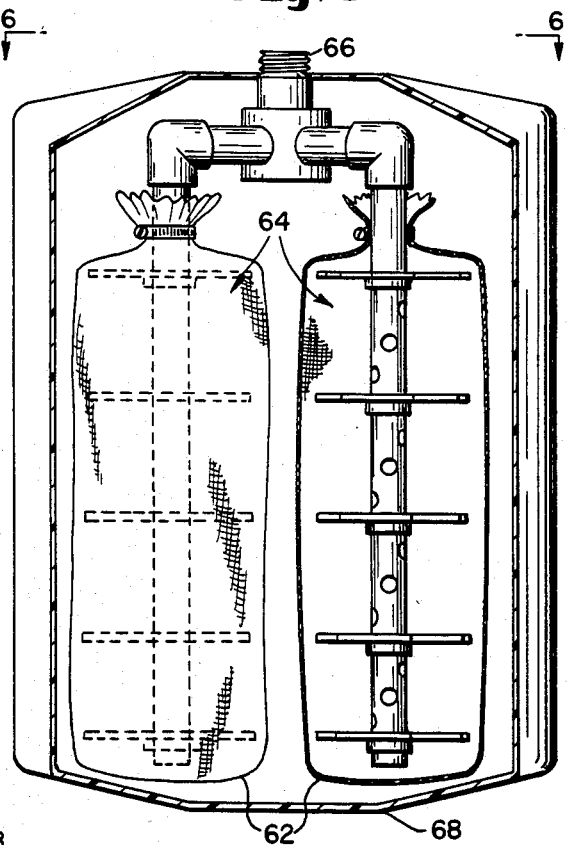

FILTERING SYSTEM FOR SWIMMING POOLS

This is a continuation of application Ser. No. 438,695 filed Nov. 2, 1982, now abandoned.

SUMMARY AND OBJECTS OF THE INVENTION

This invention relates generally to liquid filter apparatus and more specifically to a novel filter assembly especially useful in filtering water from swimming pools or the like.

Swimming pool water must be cleaned of dirt and other particulate contaminants and various proposals have been offered, such as those shown in U.S. Pat. Nos. 2,792,943; 2,851,164; 3,622,001; and 4,219,423. A known filter system which has performed reasonably well employs diatomaceous earth in powder form on a porous filter surface as the primary filter media.

Of primary concern with filter systems of this type is the duration of their effective performance life and the ease with which they may be cleaned. In prior systems employing diatomaceous earth quite often the filter surface became prematurely blocked by dirt trapped therein and it was necessary to flush the system completely in order to restore its filtering capabilities. This had to be done quite frequently, thereby consuming a considerable amount of time and wasting a substantial amount of filter media.

Accordingly, the primary object of this invention resides in the provision of a novel filter system for a swimming pool employing diatomaceous earth as a filter media, and including apparatus by which the diatomaceous earth may be automatically regenerated periodically to enhance the performance of the filter system and prolong its effective life.

Another object of this invention resides in the provision of a novel filter system comprising a filter tank, a support unit mounted centrally within the tank and including a perforated center tube and a plurality of substantially star shaped bag support elements spaced along the tube, and a flexible, expandable, cylindrical, porous filter bag supported loosely on the star shaped elements. During normal operation of the filter, water flows into the tank through the outside surface of the bag into the central tube and back to the swimming pool. The bag assumes the star shape of the elements to provide maximum filtering surface area.

Still another object of this invention resides in the provision of a novel filter system in accordance with the above wherein a powdered filter media such as diatomaceous earth is contained within the tank and during normal operation forms a filter cake on the outside surface of the bag to improve its filtering capabilities. When the bag becomes clogged due to the accumulation of dirt on the filter cake, the direction of water flow into the tank is reversed for a short period of time, e.g. a few seconds, so that water entering the inside of the bag from the central tube abruptly expands the bag to its cylindrical shape and releases the dirt from the outside surface of the bag, thereby regenerating the diatomaceous earth and prolonging the effective life of the filter.

A further object of the invention resides in provision of the novel filter system described above, wherein a multi-position valve is mounted directly on the tank for quick convenient actuation between the normal filtering cycle and the regenerating cycle.

Still other objects and advantages of the invention will become apparent upon reading the following detailed description of the invention with reference to the accompanying drawings wherein like numerals denote like elements.

BRIEF DESCRIPTION OF THE DRAWINGS

FIG. 2 is a fragmentary sectional elevational view taken generally along line 2—2 of FIG. 1 and illustrating the novel filter tank assembly of the invention;

FIG. 5 is a fragmentary sectional elevational view of a modified form of the invention employing a plurality of filter bags within a single filter tank assembly; and FIG. 6 is a fragmentary plan view taken generally along line 6—6 of FIG. 5.

DETAILED DESCRIPTION OF THE INVENTION

Figure 1:
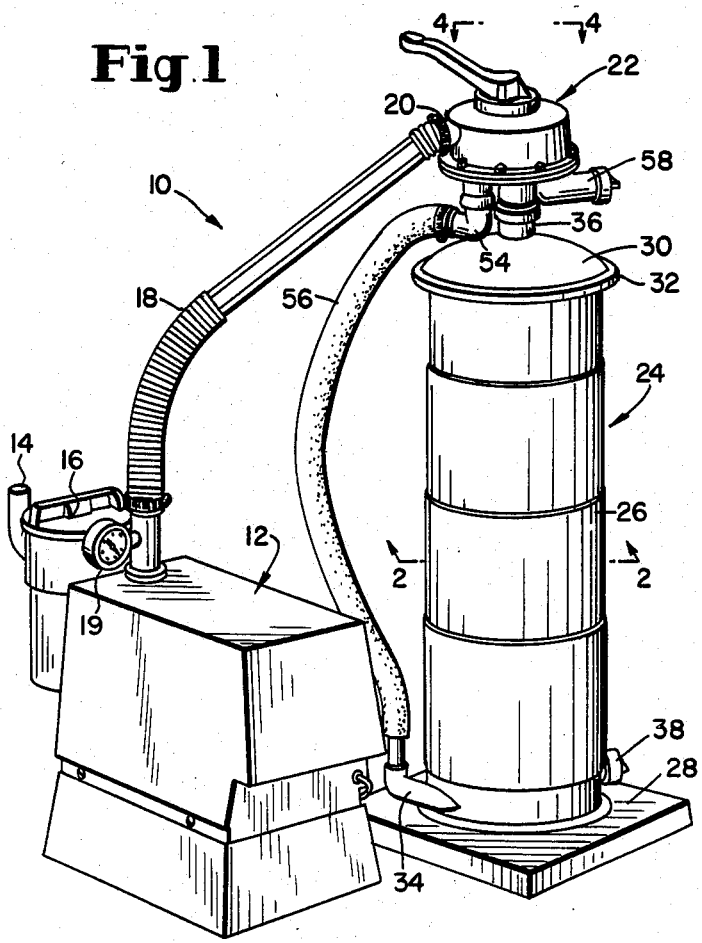
FIG. 1 is a general perspective view of the novel filter system according to the invention employing a single filter bag.
Figure 4:
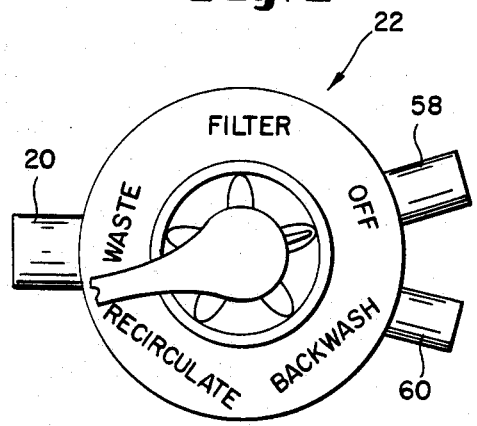
FIG. 4 is a plan view taken along line 4—4 of FIG. 2 and schematically illustrating the cycle positions of the rotary control valve.

Referring now to FIG. 1, the filter system 10 of the invention comprises a conventional pump assembly 12 having an inlet line 14 and strainer 16 adapted to receive contaminated water from a pool. Water is carried via conduit 18 from pump 12 to inlet 20 of a conventional multi-port rotary valve 22 mounted on top of an upright, generally cylindric filter tank assembly 24. A pressure gauge 19 indicates water pressure in the line side 18 of pump 12.

Figure 3:
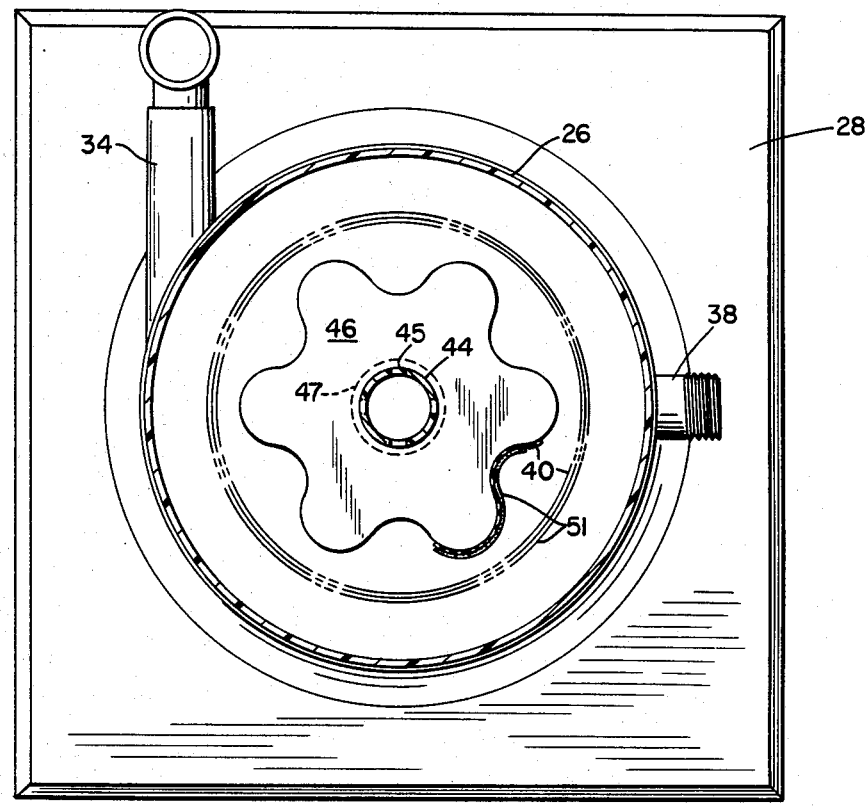
FIG. 3 is a fragmentary sectional plan view taken along line 3—3 of FIG. 2 and illustrating the star shaped bag support elements.

As shown in FIGS. 2 and 3, tank assembly 24 includes an outer cylindrical plastic casing 26 mounted on a bottom base 28 and having a removable top cover 30 fastened to casing 26 by retaining band 32. An inlet conduit 34 connects tangentially to the bottom of casing 26 and an outlet conduit 36 extends centrally upward from cover 30. A normally capped clean out drain fitting 38 is provided at the bottom of casing 26.

A flexible cylindrical porous filter bag 40 is located concentrically within casing 26 and loosely slips over a rigid support unit 42 formed by a perforated central can tube 44 having a plurality of holes 45 therein and a plurality of generally star shaped plastic support discs 46 fixed in spaced relationship on tube 44 by way of retaining rings 47. The lower end of tube 44 pinches the closed end of bag 40 within a female socket 48 on the bottom of tank 26 and the upper end of the tube fits within outlet 36. The open upper end of bag 40 is retained on tube 44 by ring clamp 50.

Cylindrical filter bag 40 is preferably of a fine-woven polypropylene cloth and is sufficiently large in expanded diameter to provide enough surface area of fabric so that the bag in its collapsed condition may conform to the undulating, corrugated star shape of discs 46 as shown in full line in FIG. 2. On the other hand, the diameter of bag 40 in its expanded cylindrical condition is smaller than the inside diameter of casing 26. For example in an actual construction, the largest diameter on discs 46 is about 5 inches, the outside diameter of bag 40 in its expanded condition is about 6 inches, and the inside diameter of casing 26 is about 7½ inches. This is evident from FIG. 3 where bag 40 is shown in phantom line in its expanded cylindrical condition. The significance of this relationship will become more apparent from the operational description below.

To assist in the filtering operation, a predetermined amount of powdered diatamaceous earth is added to tank 26 outside of bag 40 so as to form a filter cake 51 completely around the outside surface of bag 40 as shown in FIGS. 2 and 3.

As mentioned above, rotary valve 22 is a multi-position valve which selectively provides a number of operating cycles through and around filter assembly 24. As shown in FIGS. 1 and 2, valve 22 has a bottom fitting 52 which connects to fittings 36 and thereby mounts the valve directly on the top of assembly 24.

In a normal "filter" mode of operation, valve 22 receives dirty water from pump 12 and fitting 20 and directs that water by way of a bottom fitting 54 and flexible hose 56 into tangential tank inlet 34. The pressurized swirling water around bag 40 forces the bag to collapse and conform to the shape of elements 46 shown in FIGS. 2 and 3. The diatomaceous earth in tank 26 adheres to the outside surface of the bag to form filter cake 51. as the water passes through cake 51 and bag 40 into perforated tube 44, dirt particles are trapped against the outer face of cake 51. The clean filtered water then passes by way of tube 44, fitting 52, and connecting ports within valve 22 to a return fitting 58 which leads back to the pool.

During the filtering operation, maximum filtering surface area is provided by the generally undulating or pleated configuration of bag 40. The spaced disc elements 46 furnish sufficient support for bag 40, but at the same time, because they are fairly thin, they do not significantly affect water flow through the bag.

After a period of filtering operation, the length of which will of course be dependent upon the original condition of the dirty pool water, water flow through cake 51 and bag 40 will become obstructed as dirt particles accumulate on the outside face of the cake. This will be indicated by a pressure rise sensed by gauge 19. When this occurs, valve 22 is rotated to a "backwash" or regenerate position for a short period of time, e.g. 5 seconds, in which water will flow from pump 12 and fitting 20 directly to fitting 52 and into tube 44. Internal porting within valve 22 connects fitting 54 to a drain line 60.

The sudden burst of water entering the inside of bag 40 via tube 44 instantaneously expands the bag to its cylindrical phantom line condition shown in FIG. 3 and causes the dirt particles to be released from cake 51. Because the expanded diameter of bag 40 is less than the inside diameter of casing 26, no contact is made between the bag or cake and casing 26, consequently the dirt particles are freely released from cake 51, fall to the bottom of tank 26 and are passed to drain 60 by way of fitting 34 and hose 56.

Because the direction of water flow is reversed for only such a short period of time and because of its adhering affinity for bag 40, most of the diatomaceous earth forming cake 51 remains in close proximity to the outside surface of the bag and little is lost during its regenerating cycle. When valve 22 is returned to its "filter" position, bag 40 returns to its collapsed form and filter cake 51 immediately reforms in a clean, regenerated condition on the outside of the bag.

The filter assembly 24 may be regenerated several times before it becomes necessary to totally clean the unit and replace diatomaceous earth within the tank. Consequently, the effective performance life of the assembly is extended.

A modified form of the invention shown in FIGS. 5 and 6 may be used when increased filter capacity is desired. This modification includes a plurality of filter bags 62 mounted on support units 64 arranged in parallel upright relationship, the upper outlet ends of which are connected to a common outlet fitting 66 extending through the top of casing 68. The construction and function of multiple bags 62 and support units 64 are identical to bag 40 and unit 42 of the assembly of FIG. 2. During filtering operation each of the bags 62 conforms to the star shape of units 64 as water flows inwardly through bags 62 to fitting 66. During the backwash or regenerating cycle bags 62 are rapidly expanded to free the dirt. Bags 62 are sized so that upon expansion they do not contact the inner wall of casing 68; thereby permitting the dirt to be quickly released from the diatomaceous earth.

The use of the term "star-shaped" as applied to support elements 46 is intended to encompass broadly any wavy or corrugated configuration which may be used to increase substantially the effective filter surface area of bag 40.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A filter system particularly useful for filtering water from a swimming pool comprising pump means for drawing water from a pool; a filter assembly including substantially cylindrical upright tank means having at its lower end means forming a tangentially directed inlet receiving contaminated water from said pump means and at its upper end means forming an outlet to deliver clean water back to said pool, a flexible, generally cylindrical porous filter bag, a bag support unit including perforated tubular means located within said tank means and communicating with said outlet, substantially starshaped support means mounted on said tubular means, said filter bag loosely fitting over said support means and being sufficiently large in diameter so that it may freely flex between a collapsed filter condition in which it assumes the star shape of said support means and a regenerating, expanded, cylindrical condition in which it is larger in diameter than said support means, multiported valve means connected between said pump means and said filter assembly, said valve means having first filter position in which water passes through said inlet into said tank means in swirling fashion inwardly through said filter bag into said tubular means and out of said outlet, said valve means having a second regenerating position in which water from said pump means passes into said tubular means and outwardly through said bag rapidly expanding the bag to its cylindrical shape, and a powdered filter media contained within said tank means and during the filtering cycle forming a filter cake around the outside of said bag, said media being regenerated when said valve means is moved to said second position and said bag is rapidly expanded.

2. The filter system according to claim 1, wherein said support means comprises a plurality of star-shaped disc elements spaced along said tubular means and said bag fits over said elements.

3. The filter system according to claim 1, said tubular means is located substantially centrally within said tank means and wherein the cylindrical diameter of said bag is smaller than the inside diameter of said tank means.

4. The filter system according to claim 1, comprising a plurality of filter bags mounted on a plurality of bag support units in said tank means.

5. A filter assembly comprising substantially cylindrical upright tank means having at its lower end means forming a tangentially directed dirty water inlet and at its upper end means forming a clean water outlet; a flexible, generally cylindrical porous filter bag; a bag support unit including perforated tubular means located within said tank means an connected to said outlet, and substantially star-shaped support means mounted on said tubular means; said filter bag loosely fitting over said support means and being sufficiently large in diameter so that it may flex to a collapsed filtering condition in which it conforms to the shape of said support means during a normal filtering operation as water flows in swirling fashion from said inlet inwardly through said bag into said tubular means to said outlet, said bag also freely flexing to a regenerating expanded cylindrical condition during a regenerating operation during which water flow is reversed from said outlet to said inlet, said bag in its expanded cylindrical condition having a diameter greater than the diameter of said support means but less than the inside diameter of said tank means; and a powdered filter media contained within said tank means and during the filtering operation forming a filter cake around the outside of said bag, said media being regenerated when said bag is expanded to its cylindrical condition during a regeneration operation.

6. The filter assembly of claim 5, said support means including a plurality of star-shaped disc elements spaced along said tubular means, said bag fitting over and supported on said elements.

7. The filter assembly of claim 5, wherein said tubular means is located substantially centrally within said tank means.

8. The filter assembly of claim 5, comprising a plurality of filter bags mounted on a plurality of bag support units in said tank means.

9. The filter assembly of claim 5, comprising multiported valve means mounted directly on the top of said tank means and fluidly connected to said inlet and outlet, said valve means being movable to selective positions to provide either the normal filtering or regenerating modes of operation.

* * * * *